United States Patent
Wanner et al.

(10) Patent No.: US 10,118,293 B2
(45) Date of Patent: Nov. 6, 2018

(54) ARTICULATED ARM ROBOT-TYPE DEVICE

(71) Applicants: Fraunhofer-Gesellschaft zur Foerderung der angewandten Forschung e.V., Munich (DE); Universität Rostock, Rostock (DE)

(72) Inventors: Martin Christoph Wanner, Nienhagen (DE); Reinhart Kny, Zierow (DE); Michael Wollenberg, Rostock (DE); Steffen Dryba, Rostock (DE)

(73) Assignees: FRAUNHOFER-GESELLSCHAFT ZUR FÖRDERUNG DER ANGEWANDTEN FORSCHUNG E.V., Munich (DE); UNIVERSITÄT ROSTOCK, Rostock (DE)

( * ) Notice: Subject to any disclaimer, the term of this patent is extended or adjusted under 35 U.S.C. 154(b) by 0 days.

(21) Appl. No.: 15/035,577

(22) PCT Filed: Oct. 7, 2014

(86) PCT No.: PCT/EP2014/002714
§ 371 (c)(1),
(2) Date: May 10, 2016

(87) PCT Pub. No.: WO2015/067334
PCT Pub. Date: May 14, 2015

(65) Prior Publication Data
US 2016/0288320 A1 Oct. 6, 2016

(30) Foreign Application Priority Data

Nov. 11, 2013 (DE) .................. 10 2013 018 857

(51) Int. Cl.
*B25J 9/10* (2006.01)
*B25J 9/04* (2006.01)

(52) U.S. Cl.
CPC .............. *B25J 9/106* (2013.01); *B25J 9/046* (2013.01); *B25J 9/102* (2013.01); *Y10S 901/15* (2013.01); *Y10S 901/17* (2013.01)

(58) Field of Classification Search
CPC .............. B25J 9/10; B25J 9/046; B25J 9/106
(Continued)

(56) References Cited

U.S. PATENT DOCUMENTS 3,703,968 A * 11/1972 Uhrich .................. B25J 9/047
414/680
4,507,043 A    3/1985 Flatau
(Continued)

FOREIGN PATENT DOCUMENTS

DE    10 2010 023 788 A1    12/2011
DE    10 2011 087 958 A1    6/2013
(Continued)

OTHER PUBLICATIONS

International Search Report for PCT/EP2014/002714 dated Dec. 19, 2014; English Translation submitted herewith (7 Pages).

*Primary Examiner* — Ronald P Jarrett
(74) *Attorney, Agent, or Firm* — Fitch, Even, Tabin & Flannery LLP

(57) ABSTRACT

The invention relates to an articulated arm robot for handling a payload, comprising a robot arm (R), which is attached to a base (1) that can be rotated about a first axis (A1), and at least two arm elements (2 and 3), which are arranged to form a kinematic chain and a first arm element (2) is mounted on the base (1) to pivot about a second axis (A2) that is oriented orthogonally relative to the first axis and a second arm element (3) which is attached to the first arm to be pivotal manner about a third axis (A3) that is oriented parallel to the second axis (A2).

30 Claims, 7 Drawing Sheets

Figure 1A:
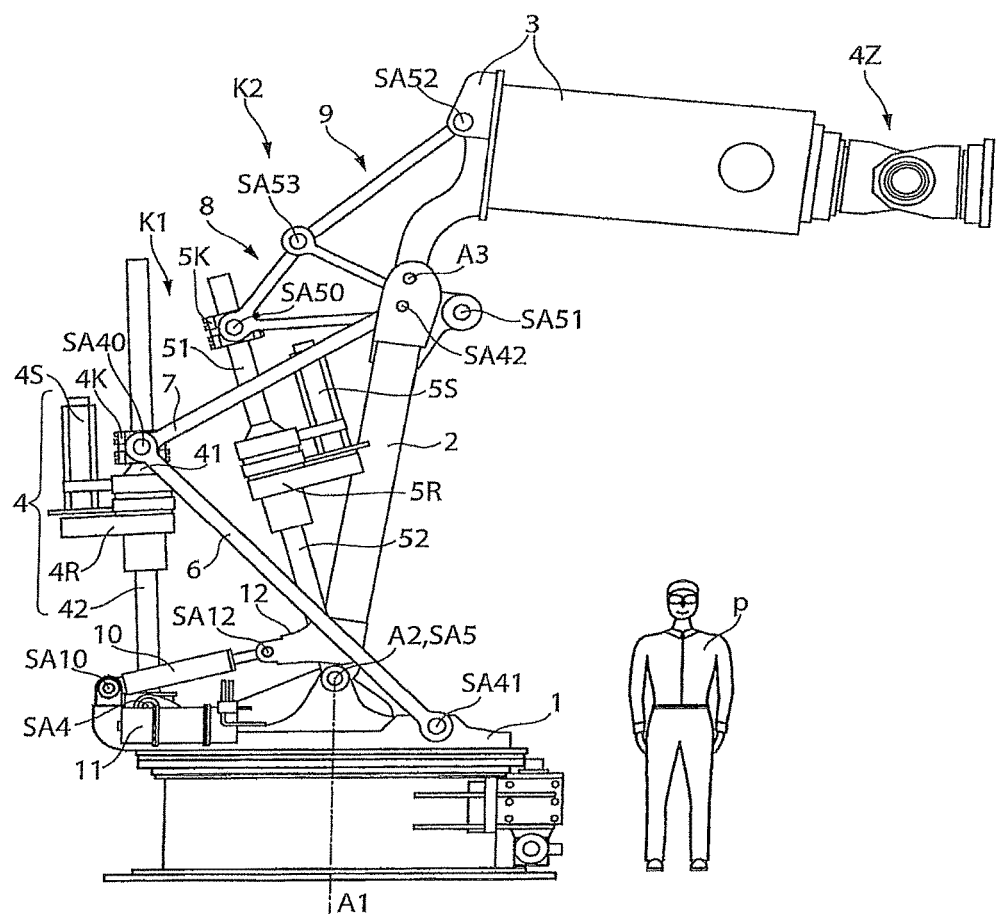

(58) Field of Classification Search
 USPC ..... 74/490.05, 490.07–490.09, 490.1, 490.5;
 901/14, 15, 19, 28; 414/732
 See application file for complete search history.

(56) References Cited

U.S. PATENT DOCUMENTS

| | | | | |
|---|---|---|---|---|
| 4,527,945 | A | * | 7/1985 | Passemard ............. B25J 9/1025 414/735 |
| 2009/0145255 | A1 | * | 6/2009 | Ehrenleitner ............ B25J 9/106 74/490.01 |
| 2010/0213153 | A1 | * | 8/2010 | Kaiser .................... B66C 23/86 212/247 |

FOREIGN PATENT DOCUMENTS

| | | |
|---|---|---|
| DE | 11 2006 001 920 B4 | 10/2013 |
| EP | 0 243 362 B1 | 3/1990 |
| JP | S5615995 A | 2/1981 |
| JP | S59166479 A | 9/1984 |
| JP | S6044276 A | 3/1985 |
| JP | S6044277 A | 3/1985 |
| JP | S60100186 U | 7/1985 |
| WO | 84/02301 A1 | 6/1984 |

\* cited by examiner

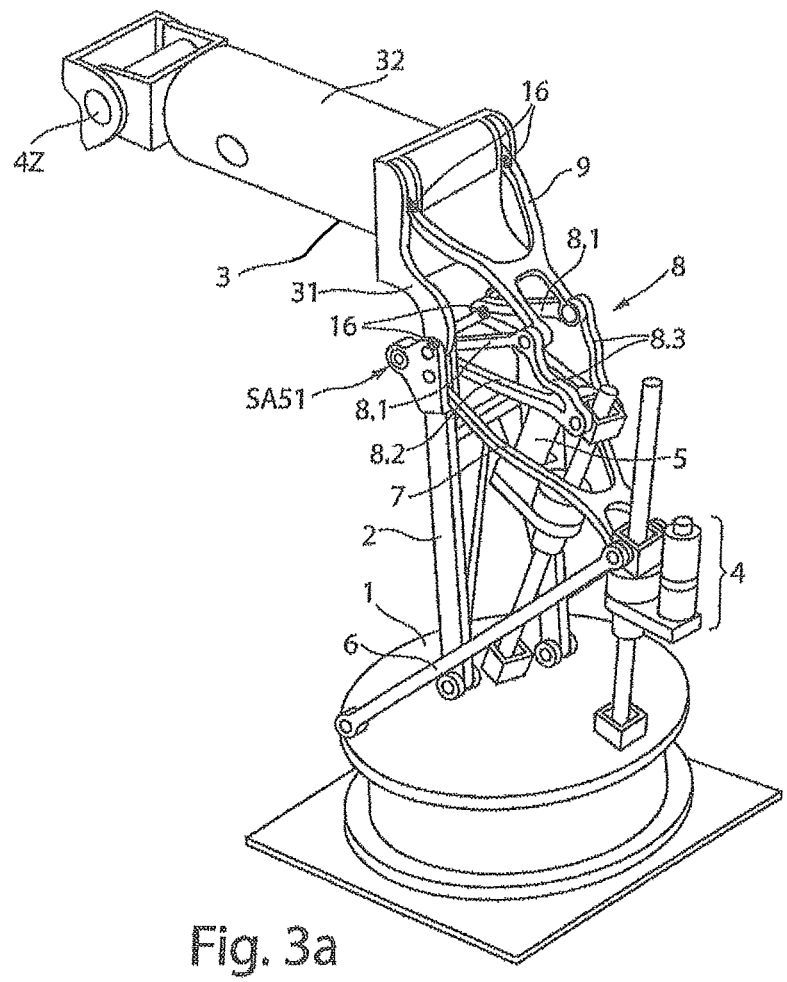
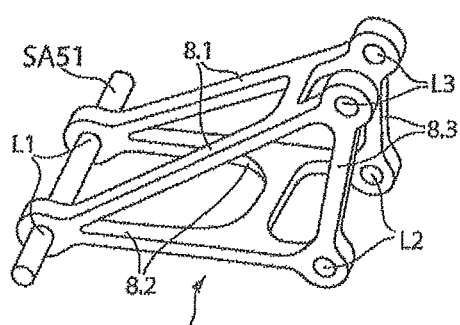 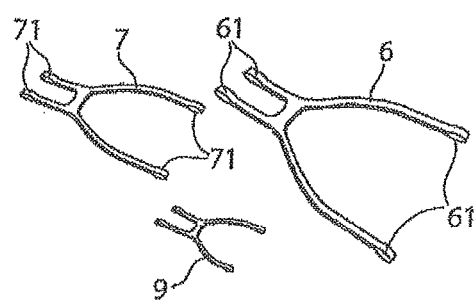
Fig. 3a
Fig. 3b          Fig. 3c

ARTICULATED ARM ROBOT-TYPE DEVICE

CROSS REFERENCE TO RELATED APPLICATION

Reference is made to PCT Application PCT/EP2014/002714 and German Patent Application No. 10 2013 018 857.1, which are incorporated herein by reference in their entirety.

BACKGROUND OF THE INVENTION

Field of the Invention

The invention pertains to an articulated arm robot for handling a payload, wherein the robot comprises an arm, which is mounted on a base that is rotatable about a first axis, at least two arm elements, which are serially arranged behind one another in the form of a kinematic chain, as well as a third arm element attached to the end of the kinematic chain. A first of the two serially arranged arm elements is mounted on the base pivotally about a second axis that is oriented orthogonal to the first axis whereas the second arm element is attached to the first arm element pivotally about a third axis that is oriented parallel to the second axis. Linear actuators, which each are a spindle drive, are respectively provided for pivoting both the first and second arm elements and comprises a motor-driven spindle nut that is engaged with a spindle which is a threaded rod mounted to pivot about a pivot axis that is oriented parallel to the second axis.

Description of the Prior Art

Articulated arm robots are versatile and widely used industrial robots, which have their kinematics composed of several arm elements that are connected to one another in an articulated fashion in order to position end effectors such as, for example, grippers or tools. Among the variety of potential robot designs, the robots with the highest mobility and flexibility are those with serial kinematics, that is each arm element only is serially connected to another arm element. However, such articulated arm robots are limited with respect to their load carrying capacity on the arm end due to the necessity to carry along drives and power transmission systems, as well as with respect to the positioning accuracy due to the cumulative effect of tolerances along the kinematic chain.

Publication WO 84/02301 describes a typical six-axis vertical articulated arm robot. The first arm element is pivotally attached to a base, which is mounted rotatably about a first axis, with one end. The first axis which corresponds to the vertical axis and the pivot axis about which the first arm element is pivotally mounted, is referred to as the second axis and is oriented orthogonal to the first axis, that is horizontal. One end of the second arm element is likewise connected to the other end of the first arm element, which lies opposite to the base, in a pivotal fashion, namely about a third pivot axis that is oriented parallel to the second axis. A central hand is mounted rotatably about three axes which picks up and manipulates workpieces, is ultimately arranged on the end of the second arm element lying opposite of the third axis.

A hydraulic cylinder is arranged between the base and the first arm element to provide a controlled motion of the first arm element about the second, horizontally oriented pivot axis. A corresponding second hydraulic unit, which ensures a controlled pivoting motion of the second arm element about the third axis, is supported on the first arm element and is connected to the second arm element.

A very similar design for realizing a vertical articulated arm robot is disclosed in publication EP 0 243 362 B1 and has a vertical articulated arm robot with two arm elements that are connected to one another in an articulated fashion. A more elaborate actuator construction is used for respectively pivoting the two arm elements about the horizontally oriented second and third axes in order to increase the operating range and the load carrying capacity of the robot. Two cylinder units are provided for this purpose, and are connected to one another by a pivotally mounted yoke and therefore are responsible for pivoting the first arm element about the second axis and for pivoting the second arm element about the third axis in a coordinated fashion. An additional power arm is pivotally coupled to the second arm element, in particular, in order to pivot the second arm element about the third axis, wherein this additional power arm extends parallel to the first arm element in order to realize a so-called "parallelogram structure," into which one of these two cylinder units is kinematically incorporated.

U.S. Pat. No. 4,507,043 discloses a vertical articulated arm robot, in which a motor-driven parallelogram structure is provided for moving the second arm element.

Publication DE 10 2011 087 958 A1 describes a modern industrial welding robot in the form of an articulated arm robot having the motion which is realized by integrating electromotive drives having a compact design within the respective rotational and pivoting axes. However, the maximum payload weight of the robot, as well as the operating range accessible to the robot, is limited as initially mentioned due to the weight of the installed components, particularly the electromotive drives.

Publication DE 11 2006 001 920 B4 discloses an articulated arm robot with two parallel kinematics. This articulated arm robot is mounted on a base, which is rotatable about a vertical first axis, and features two arm elements, which are arranged behind one another in a kinematic chain. A first arm element is mounted on the base to pivot about a second axis that is oriented orthogonal to the first axis. A second arm element is attached to the first arm element to pivot about a third axis that is oriented parallel to the second axis. A central arm element is attached to the end of the kinematic chain. A first linear actuator is provided for pivoting the first arm element about the second axis and is functionally connected to the base and to the first arm element by a first coupling. A second linear actuator is provided for pivoting the second arm element about the third axis and is functionally connected to the base, the first arm element and the second arm element by a second coupling gear. Both linear actuators are spindle drives and feature a motor-driven spindle nut that is engaged with a spindle which is a threaded rod. The spindle is mounted pivotally about a pivot axis that is oriented parallel to the second axis. The couplings respectively feature rods with a constant length that are connected and pivotally coupled in such a way that a holding force or counterforce required for absorbing a load engaged on a movable part of the kinematics remains largely independent of the motion of the kinematics in space.

SUMMARY OF THE INVENTION

The invention enhances an articulated arm robot for handling a payload, which comprises a robot arm mounted on a base that is rotatable about a first axis, at least two arm elements serially arranged behind one another in a kinematic chain, as well as a hand (third arm element) attached to the end of the kinematic chain. A first of the two serially arranged arm elements is mounted on the base to pivot about a second axis that is oriented orthogonal to the first axis. The second arm element is attached to the first arm element to pivot about a third axis that is oriented parallel to the second axis, so that the maximum payload of the robot, as well as its operating range, is significantly improved compared to current robot systems.

The robot of the invention in the form of a vertical articulated arm robot, actuates pivotally mounted arm elements with a linear actuator that is functionally connected to a coupling structure. The robot is able to position payloads, which are up to three-times heavier than those of the most powerful vertical articulated arm robots currently available on the market, with a nearly doubled operating range in all six degrees of freedom.

The articulated arm robot of the invention includes a first coupling structure which is pivotally and functionally connected to a motor-driven spindle nut of a first linear actuator by a first universal joint and a second coupling structure is pivotally and functionally connected to a motor-driven spindle nut of the second linear actuator of a second universal joint. The first and the second universal joints respectively have a pivot axis that is oriented parallel to a second axis, as well as a pivot axis that is oriented orthogonal to the second axis. The second coupling structure includes a first coupling that transmits tensile and compressive forces, as well as a second coupling structure. The first coupling structure is a triangular element in the form of a rigid triangular structure, having corners on which the first coupling structure pivots mounted about a pivot axis. In this way, the first coupling structure is connected to the spindle nut which pivots about a first pivot axis, which corresponds to the second axis of the universal joint, connected to the first arm element which is pivoted about a second pivot axis and is connected to the second coupling structure which pivots about a third pivoting axis. Each of the three corners of the triangular element has a bearing opening which contains one of the three pivot axes oriented parallel to one another. The second coupling, in contrast, has a rigid connecting brace, having one end which is connected to the first coupling structure which pivots about the third pivot axis and another end of the coupling brace which is connected to the second arm element which pivots about an additional pivot axis.

As an alternative to the design and coupling of the above-described second coupling structure, an alternative embodiment has a coupling structure with a first and at least one second coupling structure that respectively transmit tensile and compressive forces. The first coupling structure features a triangular element which is a rigid triangular structure, having corners on which the first coupling structure is respectively mounted to pivot about a pivot axis such that the first coupling structure is connected to the spindle nut and pivots about a first pivot axis, which corresponds to a pivot axis of the second universal joint, connected to the second arm element rather than the above-described first arm element which pivots about a second pivot axis and is connected to one end of the second coupling structure to pivot about a third pivoting axis so that the second coupling structure is on another end connected to the first arm element which pivots about a pivot axis.

Due to the utilization of a structural triangular element, that is a rigid triangular structure, the second coupling has a number of advantages over the initially described known solutions. The compact, rigid triangular structure makes possible increasing the motion travel, as well as to simultaneously relieving the motor drives and reducing their working strokes. Maximum static load moments also occur over the entire motion travel of the third axis in certain positions of the articulated arm robot, namely each time the second arm is in the horizontal position, as well as in an otherwise completely retracted or extended pivoting state of the first arm. These maximum load moments can be absorbed significantly due to the lever ratios of the coupling structure, which are approximately constant over the motion travel of the axis.

Furthermore, another degree of freedom is achieved for a system optimization due to the additional coupling point in the triangular structure so that the system can be better adapted to the angular range to be used with respect to the load minimization, the motion travel and the linearity of the motion.

According to the following detailed description with reference to a specific exemplary embodiment, the linear actuators are each a spindle drive with an electromotively driven spindle nut that is engaged with a spindle which is a threaded rod. The coupling structure engaged with the linear actuator can respectively convert the translatory motion of the spindle nut, which is electromotively driven along the spindle, into a rotary motion about the second or third pivot axis. The six-element design of the second coupling structure, which is preferably a Watt-type chain, pivots the second arm element, which makes possible significant enlargement of the workspace accessible to the robot arm. This particularly concerns the ability of the robot arm to access regions near the floor and the robot base.

The first arm of the robot arm preferably is functionally connected to a hydraulic cylinder that is pivotally supported on the base for absorbing the holding and supporting forces acting upon the first arm element. In this way, the spindle drives of both linear actuators preferably can be identical. This advantageously simplifies the robot actuation and also lowers the procurement costs.

A base, which is rotatable about the first axis by a motor-drive and preferably is a live ring with an external gearing, which engages two mutually tensioned driving pinions, is used for mounting the robot pivoted about the first axis that typically corresponds to the vertical axis. This tensioned gear provides a backlash-free transmission of the driving torque to the base with the robot positioned thereon.

The robot of the invention is largely designed to be a modular design. Second arm elements with different lengths can be used depending on the respective operating conditions if a corresponding mechanical interface is provided with the second arm. In this way, circular workspaces, with a radius of up to 5 m, can be realized depending on the respective requirements.

Another important aspect is the design of the third arm element, which is required for gripping and manipulating tasks and arranged on the manipulator end region of the robot arm.

The third arm element (central hand) should be as compact and lightweight as possible in order to optimize the maximum load carrying capacity of the robot. The third arm element is an independent module with the drive and actuation merely requiring an electric signal and energy supply. That is all torque motors which are required for realizing rotatory motions are integrated into the third arm element. In this case, the third arm element has three motor-driven pivot axes that are oriented orthogonal to one another including one pivot axis which can be driven via two spatially separated structures by a common driving motor having a belt drive. The two other pivot axes can be respectively driven by a driving motor arranged axially on the pivot axes.

BRIEF DESCRIPTION OF THE INVENTION

With respect to further details of the robot of the invention, reference is made to the exemplary embodiment illustrated in the figures, wherein the invention is described in greater detail below with reference to this exemplary embodiment.

Figure 2A:
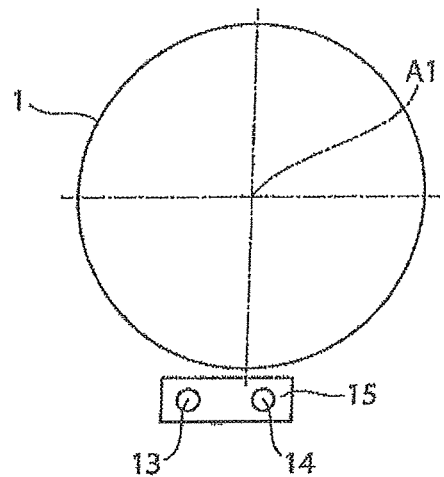
Figure 4:
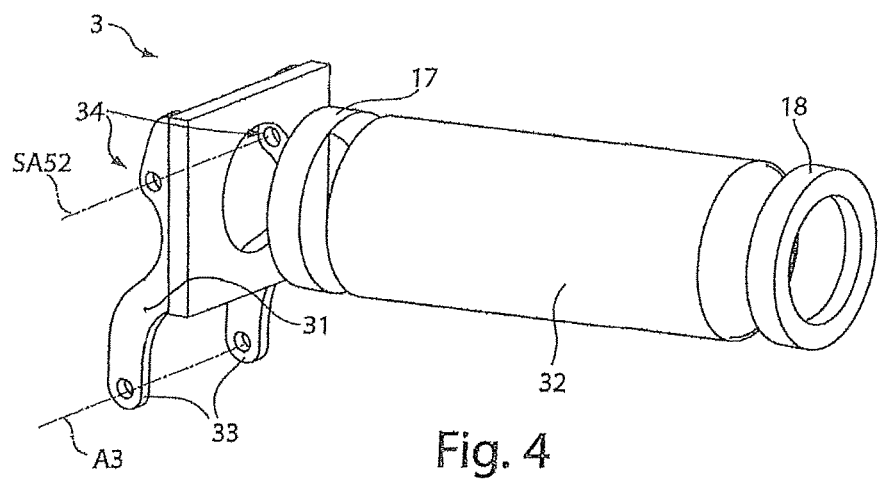
Figures 5A, 5B:
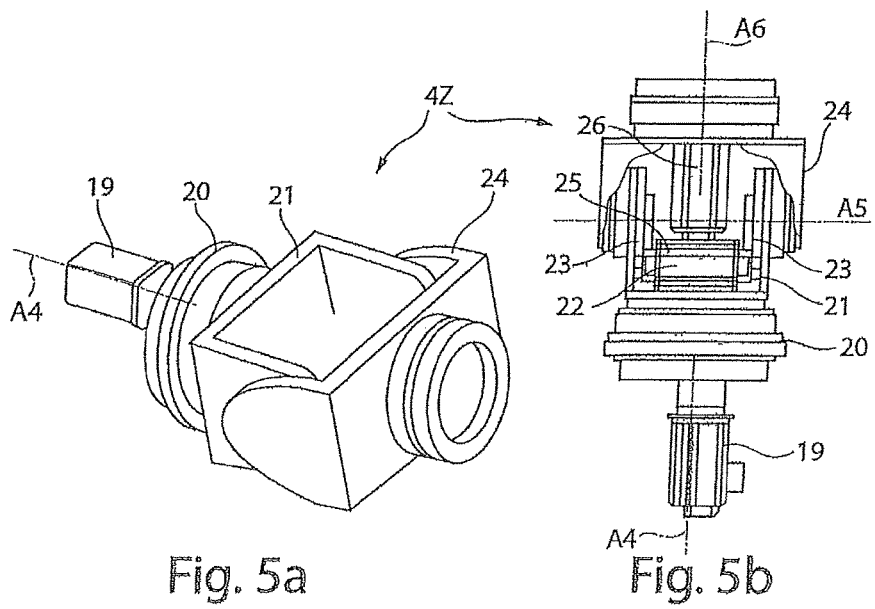
Figure 6A:
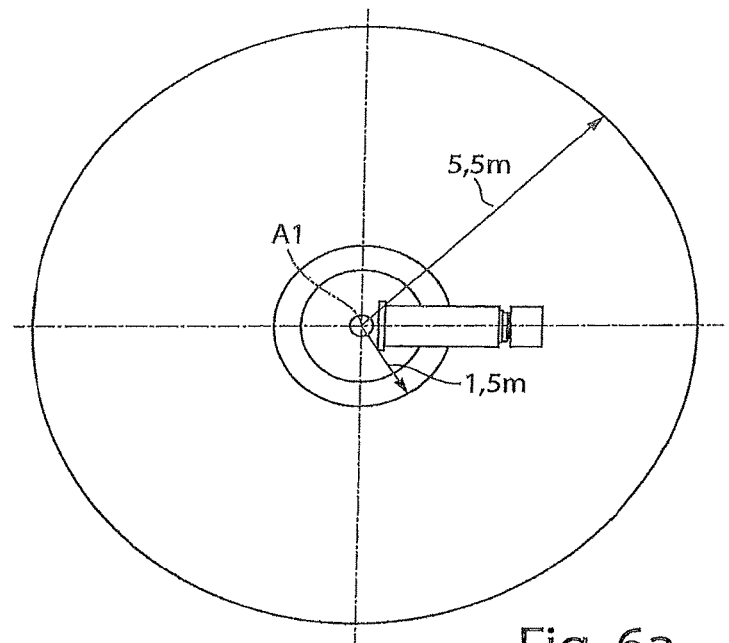

An exemplary embodiment of the invention is described below with reference to the drawings without thereby restricting the general inventive idea. In these drawings:

FIGS. 1a, b and c show side views of vertical articulated arm robots in accordance with the invention;

FIGS. 2a, b and c show schematic illustrations of the mounting and positioning of the base as a live ring in accordance with the invention;

FIGS. 3a, b and c show perspective views of couplings structures in accordance with the invention, FIG. 4 shows an illustration of part of the second arm in accordance with the invention, FIGS. 5a and b show a perspective view and a section through a third arm element (central hand) in accordance with the invention, and FIGS. 6a and b show illustrations of the operating range of the robot in accordance with the invention.

DETAILED DESCRIPTION OF THE INVENTION

FIG. 1a shows a side view in accordance with the invention of a vertical articulated arm robot with a robot arm that is arranged to rotate about a first axis A1 corresponding to the vertical axis. The robot arm comprises first and second robot arm elements 2 and 3, which are serially arranged behind one another in the form of a kinematic chain, as well as a third arm element 4Z, which is arranged on the end of the second arm element 3 and serves for handling and positioning a payload which is (not illustrated). The person P as illustrated provides a size comparison with dimensions of the robot, to which FIGS. 6a and b also refer further below.

The first arm element 2 is attached to the base to pivot about a second axis A2 that is oriented orthogonal to the first axis A1. The second axis A2 is preferably oriented horizontally. The second arm element 3 is attached to the first arm element 2 on the end of the first arm element 2, opposite of the base 1, and is pivoted about a third axis A3 that is oriented parallel to the second axis A2.

A linear actuator 4 dynamically pivots the first arm element 2 about the horizontal second axis A2. The linear actuator is functionally connected to the base 1 and to the first arm element 2 by a first coupling structure K1. The first linear actuator 4 is a spindle drive and features an electromotively driven spindle nut 41 that is engaged with a spindle 42 which is a threaded rod. The lower end is mounted on the base 1 which rotates about the first axis A1 and pivots about a pivot axis SA4 that is oriented parallel to the second axis A2.

The linear actuator 4, which is a spindle drive, features a belt drive 4R that is driven by a servomotor 4S and engages the spindle nut 41 so that the spindle nut 41 can be moved linearly upward or downward along the thread of the spindle 42 depending on the rotating direction of the servomotor.

The linear motion of the spindle nut 41 along the spindle 42 is converted into a rotatory motion of the first arm element 2 about the second axis 2 by the coupling or lever structure K1. For this purpose, the first coupling or lever structure K1 features a first and a second couplings 6 and 7 that respectively transmit tensile and compressive forces. The first coupling 6 is directly or indirectly mounted on the base 1 to pivot about a pivot axis SA41 that is oriented parallel to the second axis A2, preferably by a single-axis pivot bearing, and is connected to the spindle nut 41 of the first linear actuator 4 to pivot about a pivoting axis SA40. The pivot axis SA41, about which the first coupling 6 pivots on the base 1, is spaced apart from the pivot axis SA4, about which the spindle 42 is mounted on the base 1 to pivot, by a lateral distance in order to thereby generate the highest torque possible for moving the spindle 42 at the location of the spindle nut 41, as well as to simultaneously minimize the tensile stress along the spindle, and to prevent collisions with other components of the robot arm during the motion of the spindle drive with the first coupling structure connected thereto.

The second coupling 7 of the first coupling structure K1 is connected to the spindle nut 41 to pivot about the pivot axis SA40 and is mounted on the first arm 2 to pivot about a pivot axis SA42 that is oriented parallel to the second axis A2. Pivotally mounting the second coupling 7 on the first arm 2, is likewise advantageous to position the pivot axis SA42 as far as possible from the second axis A2 along the first arm 2, that is to be as close as possible to the end of the first arm element 2 lying opposite of the second axis A2, in order to respectively generate and transmit the highest torque possible. The arrangement of the coupling points of the individual components, which are connected to one another into a kinematic chain, naturally have to be chosen in dependence on their dimensions and lengths, particularly in dependence on the spindle length.

Both couplings 6 and 7 are connected to the spindle nut 41 by a common universal joint 4K such that the linear motion carried out by the spindle nut 41 can be converted into a pivoting motion of the first arm element 2 about the second axis A2 in a largely loss-free fashion without potential canting. Due to the optimal spacial arrangement of the kinematic coupling points of the first coupling structure K1 at the locations of the pivoting axes SA41 and SA42 and the universal joint 4K being at the location of the spindle nut 41, the tensile force acting upon the spindle 42 as a result of the motor-driven motion of the spindle nut unit 41 can be respectively reduced or minimized.

In addition, a hydraulic cylinder 10 is connected a pressure accumulator 11 which pressurizes the hydraulic cylinder 10 and is advantageously arranged on the base 1 that is rotatable about a first axis A1. The hydraulic cylinder 10 is on the one hand supported on the base 1, on which it also pivots about a pivot axis SA10. On the other hand, the hydraulic cylinder 10 is connected to an extension 12, which is rigidly connected to the first arm element 2 which is rotatable about the pivot axis SA12. The hydraulic cylinder 10 therefore serves as a weight compensation system and is capable of reducing the load of the motor-driven spindle nut 41, as well as of lowering the energy consumption of the linear actuator 4.

The drive for initiating dynamic pivoting motions of the second arm element 3 about the third axis A3 is a second linear actuator 5. The second linear actuator 5 differs from the first linear actuator 4 with respect to length, and a second coupling structure K2, which is functionally connected to the second linear actuator and is a six-element coupling structure, preferably in the form of a Watt-type chain. The second linear actuator 5 is a spindle drive analogous to the first linear actuator 4 and features a motor-driven spindle nut 51 that is engaged with a spindle 52 which is a threaded rod. For the sake of completeness, it should also be noted that a belt drive 5R, which is functionally connected to the spindle nut 51, is also driven by a servomotor 5S. A significant advantage of the robot of the invention is that identical linear actuators can be used for the first and the second linear actuators. This significantly reduces the manufacturing costs in the series production.

The linear motion carried out by the spindle nut 51 along the spindle 52 which is dependent on the rotating direction of the servomotor SS, is converted into a rotational or pivoting motion about the third axis A3, by which the second arm 3 can be pivoted relative to the first arm 2 about the third axis A3, with the aid of the second coupling structure K2.

For this purpose, the spindle 52, which is part of the second coupling structure, has its lower spindle end mounted to pivot about the pivoting axis SAS which is in common with the second axis A2, so that the spindle 52 is directly supported on the base 1. As a result, pivoting motions about the axis 2 and the axis 3 are on the one hand completely decoupled from one another and tensile forces acting upon the spindle 52 can on the other hand be directly absorbed by the pedestal of the robot which is the base 1. Drive-related tensile stresses caused by the linear actuator 5 do not occur in other supporting structures of the motion kinematics of the robot.

Figure 1B:
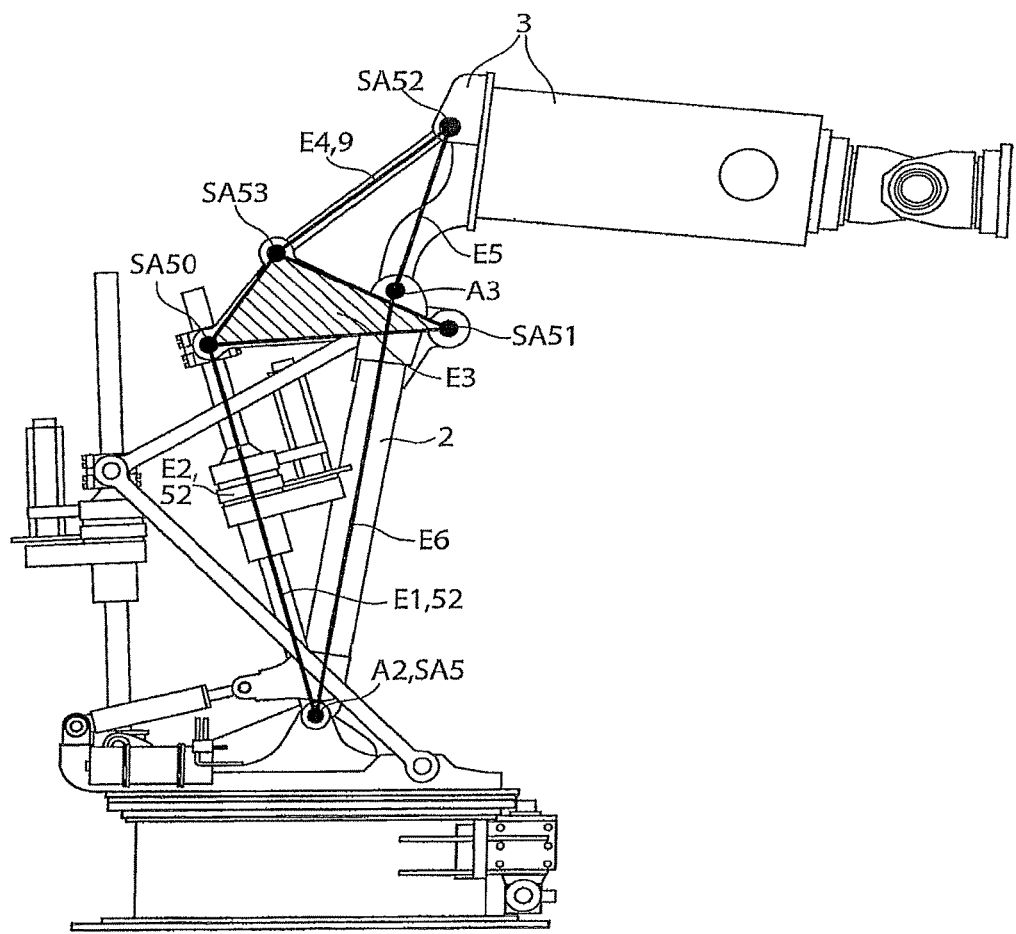

The second coupling structure K2 furthermore comprises a first coupling 8 that is embodied a rigid triangular structure, referred to as a triangular structure. The triangular structure features three coupling points that are rigidly connected to one another by connecting braces and preferably has three bearing openings. FIG. 1a shows a side view of the first coupling 8, having a three-dimensional design which is a triangular structure, that is illustrated in FIG. 3b, and is described in greater detail further below. The first coupling 8 is mounted on the first arm element 2 to pivot about a pivot axis SA51 that is oriented parallel to the second axis A2 and is rigidly connected to the spindle nut 51 of the second linear actuator 5 to pivot about at least the pivot axis SA50 by a universal joint 5K. An additional pivot axis SA53 is provided on the coupling 8, wherein the coupling 9 is mounted to pivot about the additional pivot axis and is connected to the second arm element 3 to pivot about the axis SA52. The six-element design of the second coupling structure K2 is a result of individual elements that are respectively connected to one another by articulations or pivot axes. With respect to the illustration of the individual elements E1-E6, reference is made to FIG. 1b, which shows the same design as the exemplary embodiment illustrated in FIG. 1a and is merely supplemented with the identification of the individual components E1-E6 resulting in the six-element design of the Watt-type chain of the second coupling structure K2. The spindle 52 represents the first individual component E1, along which the second component E2, which is the spindle nut 51, can longitudinally move bidirectionally. The third individual component E3 is the rigid triangular structure connected to the second individual component E2 which is the spindle nut 51 which pivots about the pivot axis SA50. The third individual component is also connected to the first arm 2 which pivots about the pivot axis SA51 and is connected to the second coupling 9 which is the fourth individual component E4 which pivots about the pivot axis SA53. The fourth individual component E4 in turn is connected to the fifth individual component E5 which is the second arm element 3 which pivots about the axis SA52. The second arm element 3 ultimately is connected to the first arm element 2 which corresponds to the sixth individual component E6 which pivots about the third axis A3.

All coupling points, lengths and connecting angles of the second coupling structure K2 are adapted to one another so that the spindle force acting along the spindle 52 is minimized and no collisions at all can occur between the motor-driven first and second coupling structures. For this purpose, the two coupling structures are a fork or a coupler as described in greater detail further below such that the force transmission, as well as the rigidity of the respective coupling structure, can be significantly increased.

The universal joints 4K and 5K of the first and the second linear actuators also ensure a power transmission and torque transmission that is free of losses, that is free of any canting, while the pivoting motions are carried out to prevent loads other than tensile or compressive forces from being transmitted along the spindles. The universal joints respectively have two pivot axes that are oriented orthogonal to one another, wherein one of the pivot axes SA40 and SA50 is respectively oriented parallel to the second axis A2. Both pivot axes of the universal joints 4K and 5K are respectively oriented orthogonal to the spindle axis of their linear actuators.

Figure 1C:
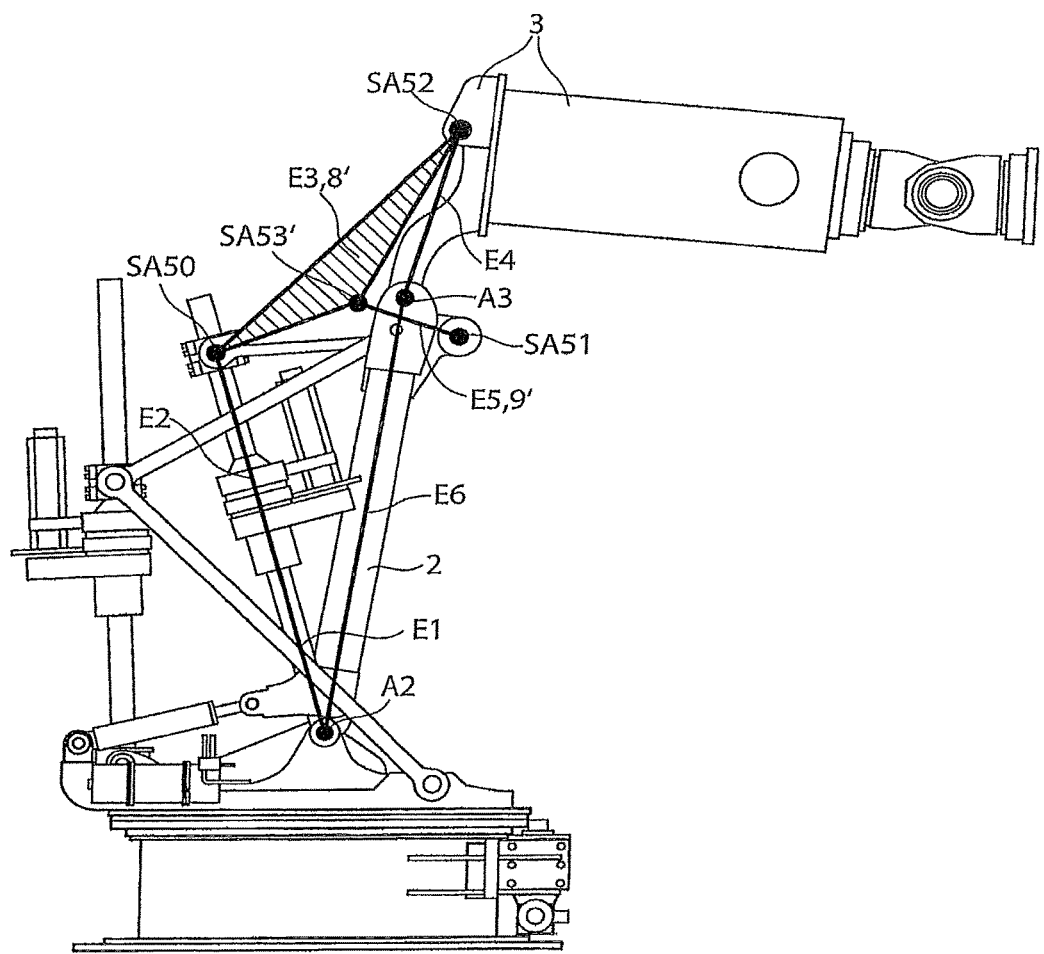

As an alternative to the above-described preferred design of the second coupling structure K2 as a six-element Watt-type chain, the coupling structure K2 can equivalently be a six-element Stephenson-type chain that is schematically indicated in FIG. 1c. Except for the design and the geometric arrangement of the above-described first coupling 8, the robot arrangement illustrated in FIG. 1c remains otherwise unchanged.

In this case, the modified coupling means 8' is a rigid triangular structure that features single-axis articulated connections, which are bearings, located at the triangle corners. The triangular structure 8' now is directly connected to the second arm element 3 to pivot about the pivot axis SA52 and is supported on the first arm element 2 to be articulated about the pivot axes SA53' and SA51 by the modified coupling 9'.

Figure 2B:
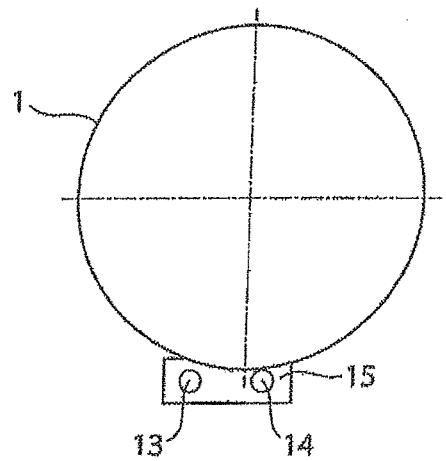
Figure 2C:
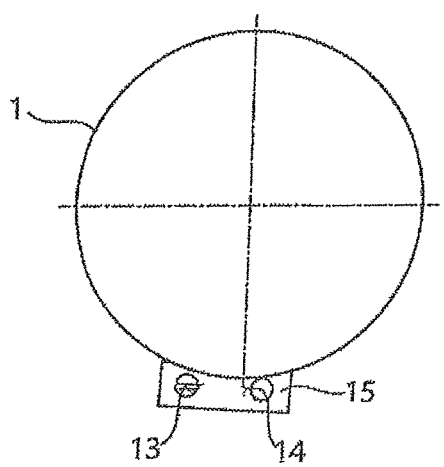

FIGS. 2a-c respectively show top views of the base 1 that is a live ring with an external thread and supported rotatably about the first axis A1. In order to ensure a stable support of the base 1, as well as a backlash-free transmission of a driving torque to the base 1 in a live ring, two driving pinions 13 and 14, which are mechanically tensioned relative to one another, are accommodated within a common gear housing which is a tensioned structure 15. It is furthermore important that both driving pinions 13 and 14, which are exact identical and independent of one another, are attached to the outer periphery of the base 1 in a live ring such that the gear wheels of driving pinions exactly mesh with those of the live ring. The backlash-free meshing of the engaged gear rims is a result of the mutual tensioning of the two gears. This arrangement can be primarily attributed to dynamic effects. Tooth flank clearance inaccuracies in the motion of the load during a reversal, that is during a change of the rotating direction should be prevented.

Due to the arrangement with two mutually tensioned driving pinions 13 and 14, a special positioning device, which allows translation and also rotatory positioning, is required for the tensioned structure 15.

In a first step, a driving pinion 14 initially is exactly engaged with the tooth flank structure of the live ring due to a translation of the gear housing as illustrated in FIG. 2b while the second driving pinion 13 remains spaced apart from the live ring structure. In the next step, the tensioned structure 15, including the driving pinion 13, is rotated about the rotational axis of the driving pinion 14 on the tooth flank contour of the live ring 1 as illustrated in FIG. 2c. This arrangement, in which the rotational axis, about which the gear housing or the tensioned gear 15 is respectively rotated, and the rotational axes of the driving pinion 14 are coaxial and in common, as a result makes possible adjustment of the reference circles of both driving pinions 13 and 14 to the reference circle of the live ring 1 independently of one another to provide perfect meshing of the gear wheel pairs.

The positioning device required for the above-described positioning process comprises specially adapted bearing shells, namely outer and inner bearing shells that respectively have different radii and are jointly arranged on guide rails such that they can be displaced in a translatory fashion. After suitable translatory positioning, the outer bearing shells are fixed and the inner bearing shells are rotated in a suitable fashion. Once both driving pinions exactly engage into the live ring, both bearing shells are rigidly connected to one another.

This ensures that both driving pinions 13 and 14 are exactly engaged with the gear rim structure of the live ring. Consequently, it is possible to transmit driving torques up to 60 kNm for moving the own weight of the robot arrangement and, in particular, for handling and positioning payloads up to 4 tons with the aid of the robot arm.

FIG. 3a shows a perspective view of a robot arm, which makes it possible to view the three-dimensional design of the first and second coupling structure. Torsional loads, which are oriented along the first and second arm elements 2 and 3, have to be at least partially absorbed by the two coupling structures K1 and K2, occur in addition to the lifting forces during the handling of payloads, that is in particular, with the aid of a third arm element 4Z that is arbitrarily rotatable about three axes. In order to ensure a sufficient load carrying capacity and, in particular, a sufficient torsional rigidity within the two coupling structures K1 and K2, the couplings for interconnecting the respective coupling structures are designed in have a clip or fork shape.

In order to respectively support or absorb the load moments acting along the robot arm, the first and the second arm elements 2 and 3 are respectively double braces that extend parallel to one another as illustrated in the perspective view according to FIG. 3a. In addition, the first and the second couplings 6 and 7 are respectively double rockers and respectively feature two connecting points or bearing openings or apertures 61 and 71 per pivot axis, by which torsional moments acting along the individual couplings can be absorbed. The individual couplings 6 and 7, formed as double rockers, have a construction design that permits manufacturing in a particularly simple fashion. The individual connecting points in the form of bearing openings, as well as the couplings 6 and 7, are flame-cut parts that are joined by welding. In this case, the welding seams are positioned in slightly stressed regions of the double rockers shown in FIG. 3c.

In addition to high torsional rigidity, the double rocker couplings 6 and 7, provide the most compact and space-saving assembly possible for both of the linear actuators 4 and 5 which drive the individual arm elements 2 and 3 and furthermore ensure that the linear actuators including the couplings connected thereto do not collide with one another while the robot is used.

FIG. 3a illustrates the design and arrangement of the second coupling structure K2, particularly the coupling 8 is a rigid triangular structure illustrated individually in FIG. 3b, in which the additional pivot axis SA51 is provided. The coupling 8 is a triangular structure which is an open, three-dimensional structure and is respectively either forks or double braces 8.1, 8.2, 8.3, to which bearing apertures L1, L2, and L3 are welded. In this case, the coupling 8 comprises an internal structural space, into which, for example, the servomotor 58 of the second linear actuator 5 can move in a collision-free fashion in the maximum extended position of the robot due to the open design of the fork or brace construction.

Furthermore, the double brace coupling 8, engages the second arm element 3 at four bearing points 16 together with the double fork second coupling 9, as illustrated in FIG. 3c. This special constructive design of the second coupling structure K2 ensures a high rigidity and allows the introduction or absorption of high torsional moments that respectively can be absorbed or are caused by the torsional rigidity of the lower first coupling structure K1.

FIG. 4 is a perspective view of the individual components of the second arm element 3. The double arm rocker 31 features bearing apertures 33 and 34 for respectively arranging the second arm element 3 to pivot relative to the first arm element 2 and the second coupling structure K2. The bearing apertures 33 provide pivoting of the second arm element 3 about the third axis A3 and the bearing apertures 34 provide coupling of the second coupling 9 of the second coupling structure K2 to pivot about the pivoting axis SA52. In order to ensure modularity of the robot system, robot arms 32' of different lengths can be rigidly attached to the double arm rocker 31 in a detachable fashion by use of a mount 17 depending on the intended use. Another mounting 18 likewise makes possible detachment of a third arm element 4Z of the type illustrated in FIGS. 5a and b.

The third arm element 4Z represents an independent module that can be replaced with a simpler solution such as, for example, a palletizing hand that suffices for many applications. The third arm element 4Z as illustrated is a classic central hand that is characterized by the following attributes:

A driving motor 19 is connected to a U-shaped transmission element 21 via a gear 20 in order to rotationally drive the transmission element about the fourth axis A4. The structure 20 features a hollow shaft having energy supply lines and data cables for the remaining drives of the third arm element 4Z which are routed through the hollow shaft. An additional motor 22 is arranged within the u-shaped transmission element 21 and initiates a motion about the fifth axis AS via an additional structure 23. The structure 23 has two opposing structures that are respectively driven by a common servomotor 22 with a belt drive. This arrangement makes it possible to provide an axis which is particularly narrow.

The opposing structures 23 of the fifth axis AS drive an additional U-shaped transmission element 24, in which the structure of the sixth axis A6 is mounted. The motors 25 and 26 of the fifth and sixth axis AS and A6 are respectively located within the two transmission elements 21 and 24 and thereby contribute to the very small dimensions of the hand axis.

The robot of the invention provides a robust and modularly variable construction that can be individually assembled in accordance with different payload tasks.

FIG. 6a shows a top view of vertical articulated arm robot of the invention with the maximum operating range of which for handling payloads up to four tons may be as large as 5.5 m. Due to the size of the robot, a region around the first axis A1 with a radius of about 1.5 m is excluded.

Figure 6B:
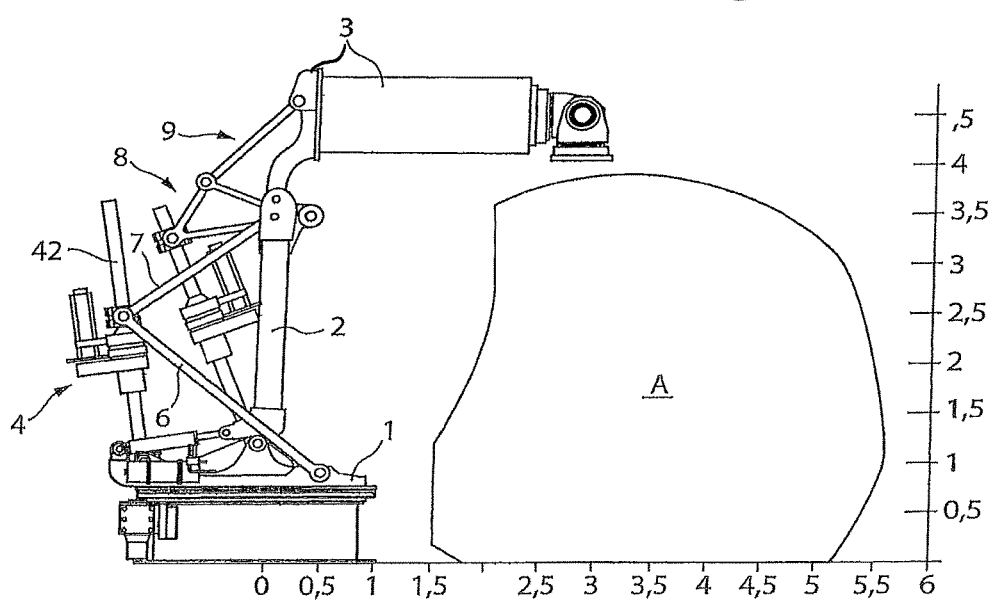

FIG. 6b shows the maximum vertical extent of the working range A that may reach a length up to 4 m in the vertical direction. The dimensions of individual robot components can be attained from FIG. 6b. For this purpose, distances are indicated in meters along the horizontal axis and the vertical axis. For example, the first arm element 2 has a length of 2.5 m measured from the position of the first axis, which has a height of 1 m as shown. The horizontal length of the second arm 3 approximately corresponds to 2.5 m.

In order to provide a robot system with a sufficiently high rigidity required for achieving a high positioning accuracy, a conventionally designed robot would have to be constructed in a very massive and heavy fashion.

In addition, the handling of heavy payloads requires very high driving torques about the individual robot axes. However, such high driving torques cannot be achieved by motors with corresponding gears of the type currently available on the market within the individual axes. These are the reasons why the kinematic design in accordance with the invention and described above was chosen in a large robot, in which the vertical axis, that is the first axis A1, was directly defined using a mutually tensioned pair of driving pinions that are engaged with a live ring. The second and third robot axis A2 and A3 are accordingly driven by linear actuators that convert their advance motion realized by coupling structures into a rotational motion of the axes. The coupling structures, which are connected to the linear actuators are a lightweight and torsionally rigid fashion due to their design in as a double brace and furthermore are capable of absorbing and withstanding high loads.

LIST OF REFERENCE SYMBOLS

1 Base
2 First arm element
3 Second arm element
31 Double arm rocker
32 Arm tube, tube
33, 34 Bearing apertures
4Z Central hand—third arm element
4 First linear actuator
41 Spindle nut
42 Spindle, threaded rod
4S Servomotor
4R Belt drive
4K Universal joint
5 Second linear actuator
51 Spindle nut
52 Spindle, threaded rod
5S Servomotor
5R Belt drive
5K Universal joint
6 First coupling
61 Connecting points, bearing apertures
7 Second coupling
71 Connecting points, bearing apertures
8 and 8' First coupling, rigid triangular structure
9 and 9' Second coupling
10 Hydraulic cylinder
11 Pressure accumulator
12 Extension
13 and 14 Driving pinion
15 Tensioned gear
16 Bearing axis
17 and 18 Mounting
19 Driving motor
20 Structure
21 Transmission
22 Motor
23 Gear
24 Transmission
25 Motor
26 Motor
A1 First axis
A2 Second axis
A3 Third axis n
A4 Fourth axis
A5 Fifth axis
A6 Sixth axis
SA4 Pivot axis
SA40 Pivot axis
SA41 Pivot axis
SA42 Pivot axis
SA5 Pivot axis
SA50 Pivot axis
SA51 Pivot axis
SA52 Pivot axis
SA10 Pivot axis
SA12 Pivot axis
SA53 Pivot axis
SA53' Pivot axis
P Person

The invention claimed is:

1. An articulated robot including a base, an arm pivotably attached to the base to rotate about a first axis, the arm comprising a first and a second arm element which are attached together in a kinematic chain, the first arm element being mounted on the base and pivoting about a second axis orthogonal to the first axis and the second arm element is pivotably attached to the first arm element to rotate about a third axis parallel to the second axis, a third arm element attached to an end of the kinematic chain, a first linear actuator for pivoting the first arm element about the second axis, which is coupled to the base by a first coupling structure and which is connected to the first arm element, a second linear actuator which pivots the second arm element about the third axis and which is connected to the base, to the first arm element and to the second arm element by a second coupling structure, the first and second linear actuators each including a power spindle drive and a motor driven spindle nut which engages the spindle and comprising a threaded rod which pivots about a pivot axis parallel to the second axis comprising:

the first coupling structure pivotably connected to the motor driven spindle nut of the first linear actuator by a first universal joint and the second coupling structure is pivotably connected to the motor driven spindle nut of the second linear actuator by a second universal joint;

the first and second universal joints each having a pivot axis parallel to the second axis and a pivot axis orthogonal to the second pivot axis, the second coupling structure including a first coupling and a second coupling which respectively transmit tensile and compressive forces; and the first coupling including a rigid triangular structure having corners, the first coupling is mounted at the corners to pivot about an axis so that the first coupling is connected to the spindle nut to pivot about a first pivot axis corresponding to the pivot axis of the second universal joint which is connected to the first arm element to pivot about a second pivot axis and is connected to the second coupling to pivot about a third pivot axis and the second coupling includes a rigid connecting brace with one end of the rigid connecting brace end being connected to the first coupling to pivot about the third pivot axis and with another end of the rigid connecting brace being connected to the second arm element to pivot about a pivot axis.

2. The robot according to claim 1, wherein the base comprises a ring with external gearing engaging with tensioned driving pinions.

3. The robot according to claim 2, wherein the externally geared ring has a diameter of 2 m.

4. The robot according to claim 2, comprising two mutually tensioned driving pinions which are part of the tensioned driving pinions mounted to translate and rotate relative to the ring.

5. The robot according to claim 1, wherein:
the third arm element is a module including a drive controlled by an electric signal from an energy supply, the third arm element including three motor-driven pivot axes that are oriented orthogonal to one another with one of pivot axes being driven via two spatially separated gears by a common driving motor and a belt drive and with two other of the pivoting axes being driven by a driving motor disposed axially on the pivot axes.

6. The robot according to claim 1, wherein the first and the second arm elements comprise double braces each having separate force transmission paths disposed between coupling points of the first and second arm elements.

7. The robot according to claim 6, wherein the second arm element comprises a double arm rocker on which a tube is rigidly mounted and is detachable.

8. The robot according to claim 1, wherein the first and the second coupling structures each comprise double forks including force transmission paths between coupling points.

9. The robot according to claim 1, wherein the first coupling structure is open and comprises one of forks and double braces and includes bearing apertures through which the first, second, third pivot axes are attached to ends of the forks or to the double braces.

10. The robot according to claim 1, wherein the first arm element is connected to a hydraulic cylinder with one side thereof being supported on the base about a pivot axis and the hydraulic cylinder pivots about a pivot axis which is parallel to the second axis.

11. The robot according to claim 1, wherein:
the first arm element has a length between 0.5 m and 4 m; and
the second arm element has a length between 0.5 m and 4 m.

12. The robot according to claim 1, wherein:
the first coupling structure includes a first and a second coupling which respectively transmit the tensile and compressive forces, the first coupling is mounted on the base and pivots about a pivot axis oriented parallel to the second axis and is connected to the spindle nut of the first linear actuator, and the second coupling structure is connected to the spindle nut of the first linear actuator and is mounted on the first arm element to pivot about a pivot axis that is oriented parallel to the second axis, and the first and the second couplings are pivotally connected to the spindle nut of the first linear actuator by the first universal joint.

13. The robot according to claim 12, wherein the pivot axis about which the spindle of the first linear actuator pivots, the pivot axis about which the second coupling of the first linear actuator pivots, and the second axis are each separated on the base and are parallel to each other.

14. The robot according to claim 1, wherein the spindle of the first linear actuator is mounted to pivot on the base.

15. The robot according to claim 1, wherein the pivot axis about which the spindle of the second linear actuator pivots contains the second axis.

16. An articulated robot including a base, an arm pivotably attached to the base to rotate about a first axis, the arm comprising a first and a second arm elements which are attached together in a kinematic chain, the first arm element being mounted on the base and pivoting about a second axis orthogonal to the first axis and the second arm element is pivotably attached to the first arm element to rotate about a third axis parallel to the second axis, a third arm element attached to an end of the kinematic chain, a first linear actuator for pivoting the first arm element about the second axis, which is coupled to the base by a first coupling structure and which is connected to the first arm element, a second linear actuator which pivots the second arm element about the third axis and which is connected to the base, to the first arm element and to the second arm element by a second coupling structure, the first and second linear actuators each including a power spindle drive and a motor driven spindle nut which engages the spindle and comprising a threaded rod which pivots about a pivot axis parallel to the second axis comprising:
the first coupling structure is pivotally connected to the motor-driven spindle nut of the first linear actuator by a first universal joint and the second coupling structure is pivotally connected to the motor-driven spindle nut of the second linear actuator by a second universal joint;
the first and second universal joints each have a pivot axis oriented parallel to the second axis and a pivot axis oriented orthogonal to the second axis; and
the second coupling structure including a first coupling and a second coupling that transmit tensile and compressive forces and the first coupling is a rigid triangular structure having corners, the first coupling is mounted at the corners to pivot about a first pivot axis corresponding to a pivot axis of the second universal joint, is connected to the second arm element which is pivotable about a second pivot axis and is connected to the second coupling to pivot about a third pivot axis.

17. The robot according to claim 16, wherein the base comprises a ring with external gearing engaging with tensioned driving pinions.

18. The robot according to claim 17, wherein the externally geared ring has a diameter of 2 m.

19. The robot according to claim 17, comprising two mutually tensioned driving pinions which include of the tensioned driving pinions mounted to translate and rotate relative to the ring.

20. The robot according to claim 16, wherein:
the third arm element is a module including a drive controlled by an electrical signal from an energy supply, the third arm element including three motor-driven pivot axes that are oriented orthogonal to one another with one of pivot axes being driven via two spatially separated gears by a common driving motor and a belt drive and with two other of the pivot axes being driven by a driving motor disposed axially on the pivot axes.

21. The robot according to claim 16, wherein the first and the second arm elements comprise double braces each having separate force transmission paths disposed between coupling points of the first and second arm elements.

22. The robot according to claim 21, wherein the second arm element comprises a double arm rocker on which a tube is rigidly mounted and is detachable.

23. The robot according to claim 16, wherein the first and the second coupling structures each comprise double forks including force transmission paths between coupling points.

24. The robot according to claim 16, wherein the first coupling structure is open and comprises one of forks and double braces and includes bearing apertures through which of the first, second, third pivot axes are attached to ends of the forks or to the double braces.

25. The robot according to claim 16, wherein the first arm element is connected to a hydraulic cylinder with one side thereof being supported on the base about a pivot axis and the hydraulic cylinder pivots about a pivot axis which is parallel to the second axis.

26. The robot according to claim 16, wherein:
the first arm element has a length between 0.5 m and 4 m; and
the second arm element has a length between 0.5 m and 4 m.

27. The robot according to claim 16, wherein:
the first coupling structure includes a first and a second coupling which respectively transmit the tensile and compressive forces, the first coupling is mounted on the base and pivots about a pivot axis oriented parallel to the second axis and is connected to the spindle nut of the first linear actuator, and the second coupling structure is connected to the spindle nut of the first linear actuator and is mounted on the first arm element to pivot about a pivot axis that is oriented parallel to the second axis, and the first and the second couplings are pivotally connected to the spindle nut of the first linear actuator by the first universal joint.

28. The robot according to claim 27, wherein the pivot axis about which the spindle of the first linear actuator pivots, the pivot axis about which the second coupling of the first linear actuator pivots, and the second axis are each separated on the base and are parallel to each other.

29. The robot according to claim 16, wherein the spindle of the first linear actuator is mounted to pivot on the base.

30. The robot according to claim 16, wherein the pivot axis about which the spindle of the second linear actuator pivots contains the second axis.

* * * * *